Jan. 13, 1959     A. W. WHITESELL     2,867,943
TREE INJECTION DEVICE
Filed Nov. 29, 1957
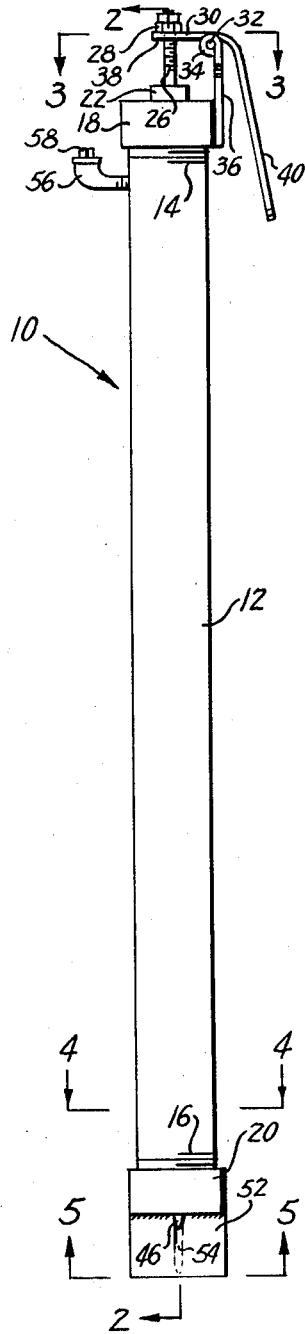
FIG. 1
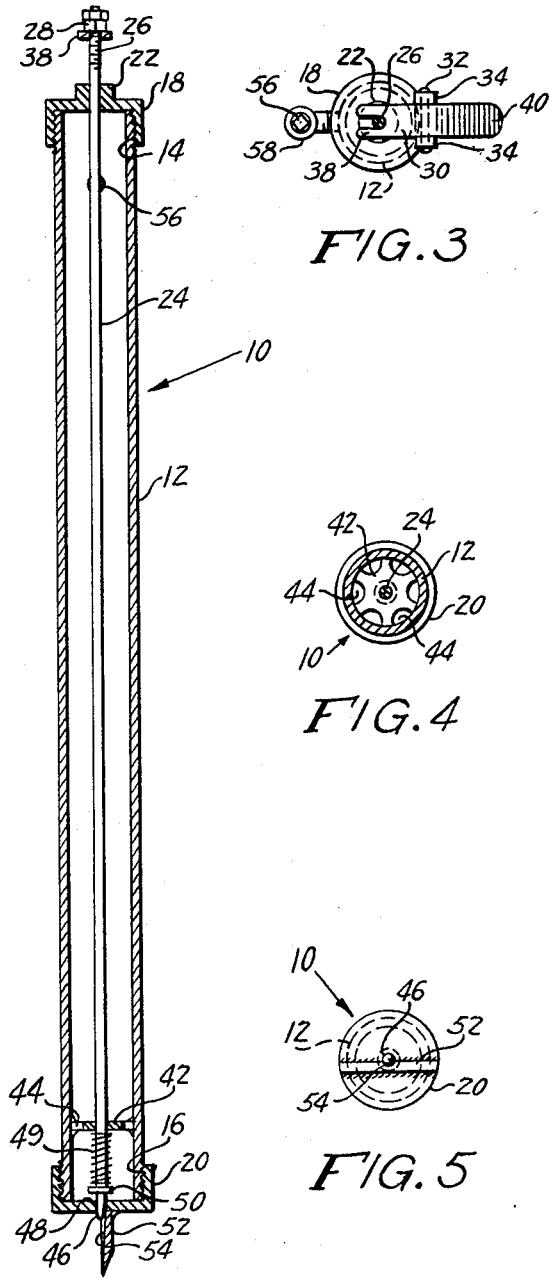
FIG. 2
FIG. 3
FIG. 4
FIG. 5
INVENTOR
ALBERT W. WHITESELL
BY Gustave Miller
ATTORNEY

United States Patent Office 2,867,943
Patented Jan. 13, 1959

2,867,943
TREE INJECTION DEVICE
Albert W. Whitesell, Caddo, Okla.

Application November 29, 1957, Serial No. 699,791

1 Claim. (Cl. 47—57.5)

This invention relates to a tree injector, and it particularly relates to an injector which can be used to poison trees.

It is often necessary to clear wooded land in order to place the land under cultivation or in order to build new housing. If the trees are merely chopped down, it is necessary to thoroughly remove all the roots in order to prevent further sprouting in the future. However, not only is this a quite arduous and time consuming job, but one can never be certain that the entire root system has been destroyed. In order to effect a complete kill of the tree, certain poisons have been developed which, when injected into the tree, spread throughout its root system and completely destroy it. Certain injection devices have been developed to inject these poisons into the trees; however, these injection devices, heretofore used, have been quite complex and, therefore, not only expensive to produce but also apt to be easily broken or damaged.

It is one object of the present invention to provide an injection device of the above type which is simple in construction and not easily broken.

Another object of the present invention is to provide an injection device which is easy to use and easy to repair if damaged.

Other objects of the present invention are to provide an improved injection device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a side elevational view of a device embodying the present invention.

Fig. 2 is a sectional view taken on line 2—2 of Fig. 1.

Fig. 3 is a top view taken on line 3—3 of Fig. 1.

Fig. 4 is a sectional view taken on line 4—4 of Fig. 1.

Fig. 5 is a bottom view taken on line 5—5 of Fig. 1.

Referring now in greater detail to the drawing wherein similar reference characters refer to similar parts, there is shown an injection device, generally designated 10, which comprises a cylindrical barrel 12 externally threaded at its upper and lower ends, as at 14 and 16 respectively, to releasably receive the internally threaded cap-like closure members 18 and 20 respectively.

The closure member 18 is provided with a central boss 22 which defines a central bore through which extends a rod 24 the main portion of which is positioned in the barrel 12. The upper end of the rod 24, above the closure member 18, is threaded at 26 to threadedly receive a nut 28. This nut 28 coacts with a forked finger or lever 30 pivoted on a pivot pin 32 between bearings 34 on an upstanding support bracket 36 extending up from the closure member 18. The finger or lever 30 is provided with a front fork portion 38 to receive the rod 24 and a rear handle portion 40 to move finger 30 around its pivot pin 32.

The rod 24, within the barrel 12, extends through a centrally-perforated spider disc 42 connected at its periphery to the interior of the barrel 12 adjacent the lower end of the barrel, the spider disc 42 acting as a guide for the longitudinal movement of the rod 24 within the barrel 12. The periphery of the spider disc 42 is provided with a series of grooves 44 which provide passages through the disc for vertical flow of fluid within the barrel.

The lower end of the rod 24 is pointed to form a needle valve 46 adapted to seat within a valve opening 48 in the closure member 20. A coil spring 49 surrounds the rod 24 between a spring-retaining washer 50 fixed on the rod 24 just above needle valve 46 and the spider disc 42. This spring acts to bias the needle valve onto its seat within the opening 48.

Integral with the closure member 20 and depending therefrom is a chisel portion 52 extending across the diameter of the closure member 20. A groove 54 extends vertically down the center of the chisel portion and this groove coincides with the valve opening 48 in closure member 20. By this construction, when the needle valve is raised from its seat in the valve opening 48, fluid within the barrel 12 passes through the valve opening and down through the groove 54 in the chisel portion 52.

The needle valve 46 is raised from its normally closed position by pushing down on handle 40. When handle 40 is pushed down, finger 30 pushes fork 38 up against nut 28 and thereby raises rod 24, which raises valve 46. When handle 40 is released, valve 46 is forced down into valve openings 48 by the coil spring 49.

The poison, in the form of a liquid or gaseous solution or emulsion is passed into the barrel 12 through an inlet 56 near the top of the barrel. This inlet may be used as a filling inlet pipe wherein the fluid is inserted and then the pipe is closed by a plug 58; or it may be connected to a garden hose or the like by means of common threaded couplings or the like.

In operation, the fluid is inserted through pipe 56 or a poison powder is inserted and then a solution is formed either by inserted liquid or through a hose. Then the device is brought against the tree with a chopping or chiseling action with the chisel portion chopping into the bark of the tree to expose the inner portion. At the same time, the handle 40 is pressed down whereby the valve 46 is lifted and the poison fluid runs down through the groove 54 into the tree.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A tree injection device comprising an elongated barrel, a closure member at each end of the barrel, a plunger positioned for axial movement in said barrel and having one end extending through the corresponding closure member at one end of the barrel, a valve head at the opposite end of the plunger, a valve opening in the closure member at the opposite end of the barrel, said valve head being movable to seat in said valve opening to close said valve opening, means biasing said valve head into said valve opening, means connected to said one end of said plunger outside said barrel for moving said plunger against the biasing direction of said valve head, chopping means on said closure member at said opposite side of the barrel, said chopping means being in alignment with said valve opening, said chopping means comprising a chisel portion integral with said closure member at said opposite side of said barrel, said chisel portion comprising a blade having a beveled cutting edge and a central groove extending from a point adjacent to said valve to said cutting edge of said blade, and means biasing said valve head comprising a coiled spring surrounding said plunger, a washer on said plunger, a plunger guide on said barrel, said coiled spring being positioned between said washer and said plunger guide, and a finger connected to said plunger at one end pivoted to the corresponding closure member at its other end, and a handle extending from the pivotal connection to the closure member.

References Cited in the file of this patent

UNITED STATES PATENTS

| | | |
|---|---|---|
| 612,745 | Morris | Oct. 18, 1898 |
| 1,954,698 | Giddings | Apr. 10, 1934 |

FOREIGN PATENTS

| | | |
|---|---|---|
| 8,462 | Australia | of 1913 |